United States Patent [19]
Ellwood

[11] Patent Number: 4,487,339
[45] Date of Patent: Dec. 11, 1984

[54] METHOD OF AND APPARATUS FOR STORING AND DISPENSING A MIXTURE OF PARTICULATE MATERIALS

[75] Inventor: Henry Ellwood, Rochdale, England

[73] Assignee: USM Corporation, Farmington, Conn.

[21] Appl. No.: 395,124

[22] Filed: Jul. 6, 1982

[30] Foreign Application Priority Data

Jul. 23, 1981 [GB] United Kingdom ............... 8122795

[51] Int. Cl.³ .............................................. G01F 11/20
[52] U.S. Cl. ..................................... 222/236; 414/268
[58] Field of Search ............... 414/268, 269, 293, 298, 414/299, 301, 304, 325, 326, 219; 222/370, 236; 366/186, 189, 196

[56] References Cited

U.S. PATENT DOCUMENTS

| | | | |
|---|---|---|---|
| 1,735,392 | 11/1929 | Hiller | 414/219 |
| 2,574,231 | 11/1951 | Sinden | 222/370 X |
| 2,586,980 | 2/1952 | Myers | 222/370 |
| 2,901,150 | 8/1959 | Matter | 222/370 |
| 3,735,881 | 5/1973 | Wilding | 414/300 |

Primary Examiner—Robert J. Spar
Assistant Examiner—Stuart Millman
Attorney, Agent, or Firm—Vincent A. White

[57] ABSTRACT

Mixtures of particulate material of widely different particulate sizes segregate on storage, smaller particles falling to the bottom. In the invention mixture is supplied to a bunker in a plurality of layers and subsequently withdrawn so that mixture is taken from each layer simultaneously. Apparatus used comprises a rotor dividing the bunker into several equal compartments. During introduction of a batch of mixture to the bunker the rotor is rotated through several revolutions so that the mixture forms layers in each compartment. The bottom of the bunker is flat. An outlet slot in the bottom extends along a chord. A crew conveyor below the slot carries mixture falling through the slot away from the bunker. The rotor rotates slowly during dispensing in synchronism with the conveyor, pushing mixture to the slot at such a rate that material from every layer in a compartment falls into the slot simultaneously, the compartments being progressively emptied.

1 Claim, 2 Drawing Figures

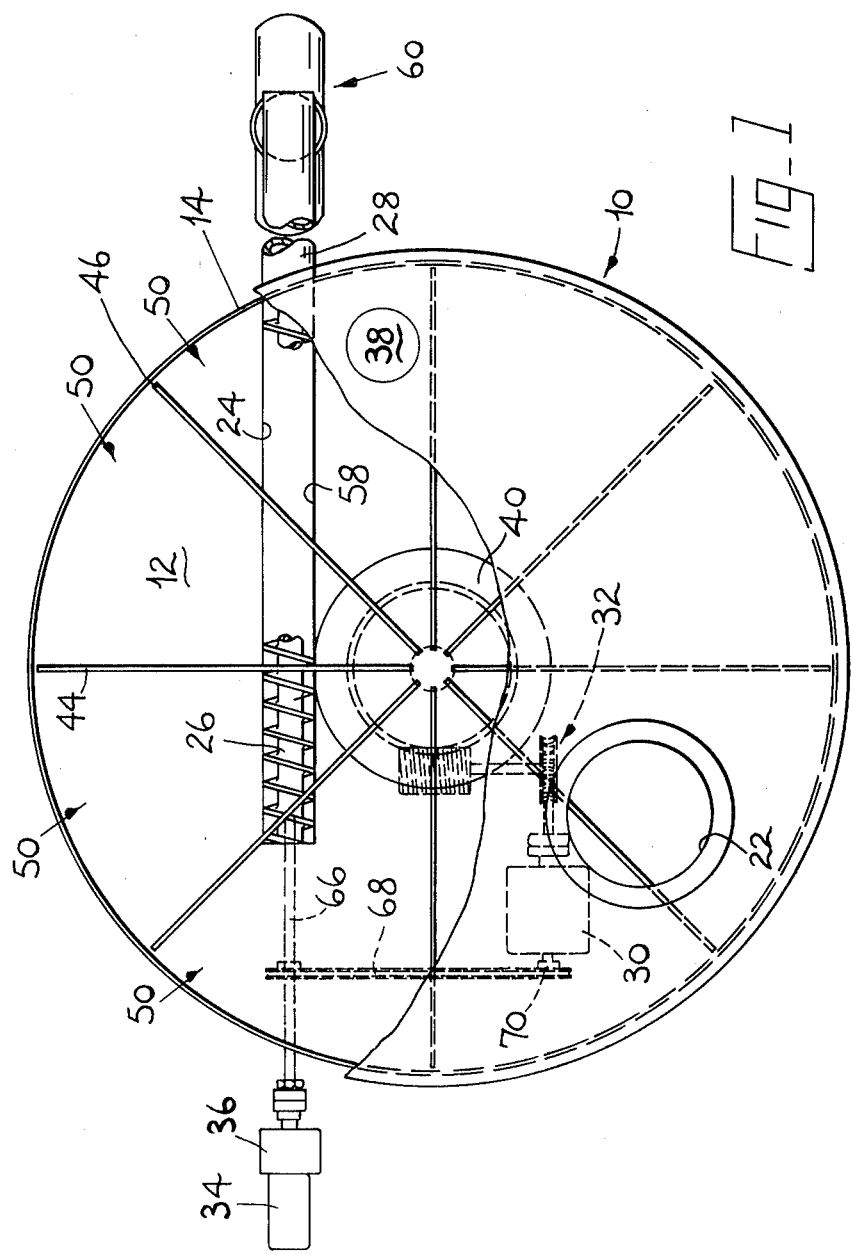
Fig_1

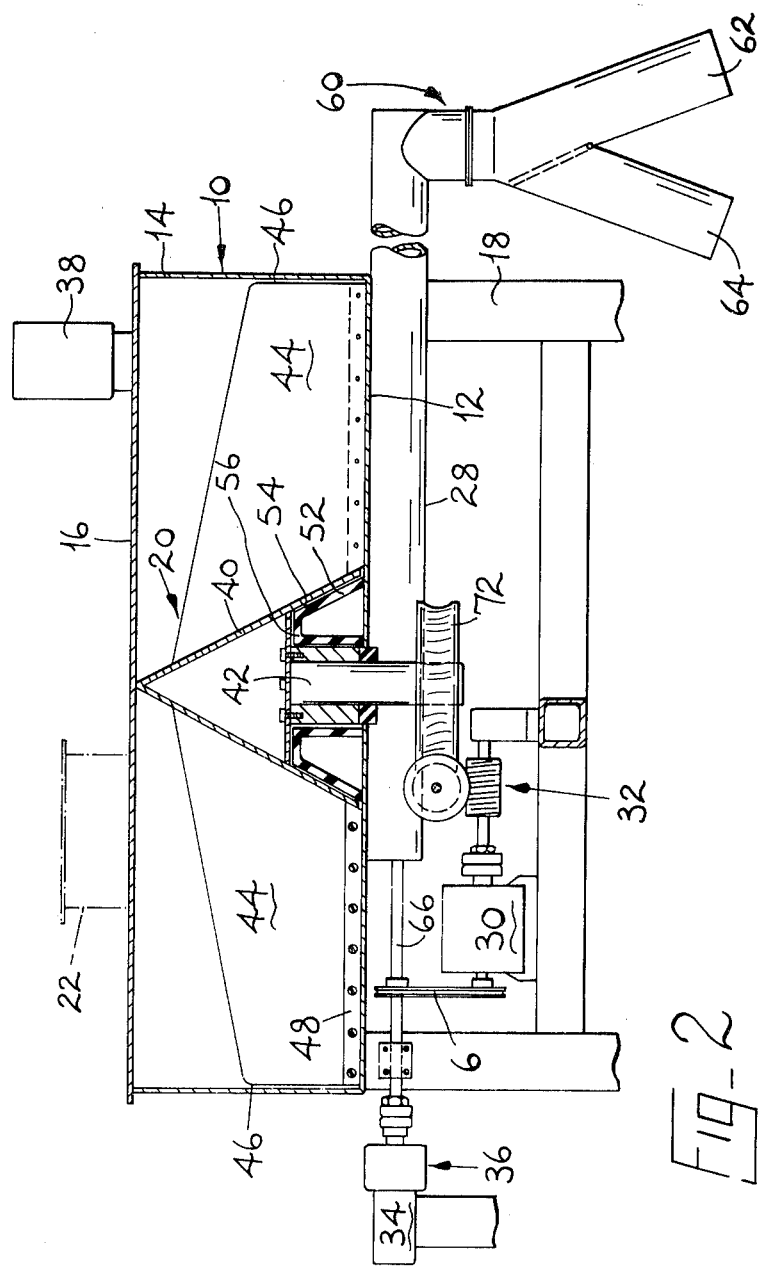

4,487,339

METHOD OF AND APPARATUS FOR STORING AND DISPENSING A MIXTURE OF PARTICULATE MATERIALS

FIELD OF THE INVENTION

This invention is concerned with a method of and apparatus for storing and dispensing a mixture of particulate materials, for example materials which, when subsequently homogenized, provide rubber or thermoplastics compositions.

DESCRIPTION OF THE PRIOR ART

In the manufacture of rubber or plastics compositions (including thermoplastics or thermosetting compositions) for extrusion or other processing, it is frequently necessary to thoroughly mix and homogenize various materials in addition to the basic polymer. For example, in the manufacture of vulcanizable rubber compositions it is necessary to compound together and thoroughly homogenize with the rubber carbon black, sulphur, and other minor ingredients. Where batch processing is to be used it is possible to supply materials to a batch to be compounded in suitable proportions, even though the proportion of certain of the compounding ingredients, relative to the major ones for example rubber and carbon black, is very small. However, in many circumstances it is preferred to effect a continuous compounding operation and in this case although it is possible to feed materials continuously, where there is a great disparity between the weights of certain ingredients to be used in the composition in comparison with others it is extremely difficult to feed the materials to be supplied in small amounts sufficiently accurately to maintain the formulation within the desired limits. One practice which has been adopted to ameliorate this difficulty has been to form a premix of the various particulate materials as a batch using a suitable premixer, for example as supplied by Winkworth. The premixed batch is then supplied to a steady rate to the continuous processing apparatus. Conveniently each batch is supplied to a storage hopper from which it is fed to the continuous processing apparatus, for example a mixing and venting extruder supplied under the designation MVX by the applicant company, a description of this extruder being described in U.K. patent specifications Nos. 1,536,542 and 1,550,364 which correspond respectively to U.S. Pat. Nos. 4,004,787 and 4,053,144

The above described method of supply of particulate material for processing is satisfactory where a stable premix of the particulate material can be formed. However, in some circumstances, for example where there is a large disparity between the particle size of the various materials to be mixed, there has been a tendency for the particulate materials to segregate during storage, even though a uniform premix has been initially supplied by the premixer. For example, in the storage of premixes comprising rubber and various other particulate ingredients, stable premixes can usually be formed where the rubber articles are less than about 8 mm in maximum dimension but if larger rubber particles are used there is a tendency for segregation to occur during storage. This leads, subsequently, to the production of rubber compounds by the subsequent continuous processing apparatus which are not consistent in composition, for example the compounds may at certain stages in production be rich in carbon black (forming a very hard composition) and at other times be rich in rubber (forming much more elastic and softer compositions). This inconsistency in formulation of the compounded materials is unacceptable for many applications. In many instances it is preferred, if possible, to use large particles because production of smaller particles (which would form a stable premix) involves additional processing and thus greater expense, for example rubber to be processed is commonly supplied in bales which must be cut to form rubber particles: clearly the smaller the particles to be produced from a bale, the more cutting operations are necessary, involving additional expense.

One of the various objects of the present invention is to provide an improved method of storing and dispensing mixtures of particulate materials and apparatus for use therein in which the composition of mixture dispensed therefrom is maintained within acceptable limits.

SUMMARY OF THE INVENTION

The invention resides in a method of and apparatus for storing and dispensing a mixture of particulate materials. In carrying out a method in accordance with the invention the mixture to be stored and dispensed is supplied to a storage vessel as a plurality of layers disposed one on top of the next. Subsequently the mixture is withdrawn from the vessel in such a manner that material is taken from a plurality (preferably all) of the layers simultaneously, or substantially so, and dispensed from the storage vessel: the mixture thus dispensed from the storage vessel consists of material taken from a plurality (preferably all) of the layers. In this way, provided that the material originally supplied to the storage vessel has the desired overall formulation, any differences in formulation arising between different layers are compensated for when the material is withdrawn from the storage vessel and dispensed by ensuring that each unit amount of the mixture dispensed is drawn from several, preferably all, of the layers. Preferably, in carrying out a method in accordance with the invention, the mixture supplied to the storage vessel has been the subject of a batch type premixing operation. In the batch premixing operation it is ensured that the materials introduced into the premixer are present in the desired formulation and the particulate material supplied thereto are thoroughly mixed, still in particulate form. The mixture of thoroughly mixed particulate materials is then preferably discharged rapidly (in a period of 20 to 30 seconds for a volume of about 250 liters) into the storage vessel: rapid discharge of the mixture from the premixer is believed to militate against segregation of the particulate materials.

In carrying out a method in accordance with the invention, apparatus comprising a storage vessel of circular cross-section with a flat, or substantially flat bottom and a vertical or substantially vertical wall (preferably cylindrical) is used. This apparatus in accordance with the invention further comprises a rotor mounted for rotation about an axis coaxial with the storage vessel, the rotor having a plurality of, suitably flat, blades extending from a central hub to the wall of the vessel, thereby dividing the storage vessel into a plurality of sectors. An outer edge of each blade contacts the wall of the vessel, a lower edge of each blade preferably provided by a flexible sealing member (e.g. of nylon) contacts the bottom of the vessel and each blade extends upwardly from the bottom of the vessel for a substantial part of the depth of the vessel whereby to militate against leakage of material from one sector to the next: Each of the sectors thus effectively provide a compartment which is sealed from the next adjacent compartment. Conveniently there are eight blades, dividing the storage vessel into eight equal compartments. Preferably the central hub of apparatus in accordance with the invention from which the blades project is conical with the apex of the cone pointing upwardly and the base of the cone closely adjacent to the bottom of the vessel. Preferably the hub is secured to a drive shaft projecting upwardly through an opening in the bottom of the vessel, the opening being bounded by a collar secured to the bottom of the vessel and projecting upwardly therefrom to militate against escape of material from the vessel through the opening.

Apparatus in accordance with the invention further comprises an inlet at the top of the vessel through which the mixture can be introduced into the vessel; conveniently the top of the vessel is closed by a top wall and the inlet is in the form of a short tube set in the wall and opening into the interior of the vessel. Preferably, the inlet is positioned to deposit material introduced therethrough into an annular region between the central hub of the rotor and the wall of the storage vessel. Apparatus in accordance with the invention further comprises an outlet slot in the bottom of the vessel, the slot being of substantial length relative to the diameter of the bottom of the vessel and narrow in comparison with its length. Suitably the slot lies on a chordal path and the axis of rotation of the rotor does not intersect the slot or the chordal path on which the slot lies. Suitably an inner edge (closest to the axis of the rotor) of the slot is tangential or substantially tangential to the central hub; where the central hub is conical the slot is tangential or substantially tangential to the base of the central hub. The chordal path on which the slot lies intersects the wall in two regions; preferably the slot extends along the bottom of the vessel on the chordal path from one of these regions over more than half of the length of the chordal path between the two regions on which it intersects the wall. A conveyor, preferably a screw conveyor, is disposed beneath the slot arranged to convey material falling through the slot from the vessel away from the vessel. Where apparatus in accordance with the invention comprises a screw conveyor a screw is conveniently mounted for rotation in an outlet channel part at least of which is disposed beneath the slot and which is sealingly secured to the bottom of the vessel said parts being coextensive with the slot. The inlet to the storage vessel is suitably positioned to discharge material into the storage vessel remote from the outlet slot.

Apparatus in accordance with the invention further comprises means for rotating the rotor (conveniently a motor driving the rotor through a transmission) relative to the storage vessel as the mixture is introduced through the inlet opening at such a rate that part of the mixture is supplied to each of the sectors, the rotor completing a number of revolutions during the period in which mixture is introduced into the storage vessel so that in each sector a plurality of layers of the mixture are deposited. Apparatus in accordance with the invention further comprises means for operating the conveyor (preferably comprising a motor the speed of which can be varied to vary the rate at which the mixture is dispensed from the apparatus) for operating the conveyor to withdraw the mixture from the vessel at a desired rate and for rotation of the rotor relative to the storage vessel (at a much slower rate of rotation than during supply of the mixture to the vessel) whereby to progressively remove the mixture from each sector. The rate of withdrawal of the mixture by the conveyor is synchronized with the rate of rotation of the rotor (preferably where the means for operating the conveyor comprises a motor by a transmission e.g. a chain drive mechanism, which is effective to cause the rotor to rotate at a speed synchronized with the speed of the conveyor). The rate of operation of the conveyor and the synchronized rate of rotation of the rotor are selected so as to ensure that material from a plurality of the layers of the mixture in each sector from which material is being withdrawn falls through the slot simultaneously to be conveyed away by the conveyor. Preferably, the transmission by which the motor of the means for operating the conveyor is connected to the rotor includes a free wheel mechanism permitting the rotor to be driven by the aforesaid means for rotating the rotor, during operation of the conveyor by its motor.

Preferably, apparatus in accordance with the invention further comprises a diverter mechanism disposed at an outlet of the conveyor, which may be operated to allow mixture withdrawn from the vessel to pass for subsequent processing or to be diverted back for return to the storage vessel through the inlet (when the rotor is rotating at the supply speed) or even to the premix mixer. The diverter mechanism is intended to be operated should any discrepancy in formula be apparent in the dispensed material, as may be the case during the initial part of a dispensing operation.

There now follows a detailed description to be read with reference to the accompanying drawings of a storing and dispensing apparatus embodying the invention and its method of operation also embodying the invention. It will be realized that this apparatus and method have been selected for description to illustrate the invention by way of example.

DESCRIPTION OF THE DRAWINGS

FIG. 1 is a plan view with parts broken away showing the illustrative storing and dispensing apparatus; and FIG. 2 is a side view partly in section and with parts broken away of the illustrative apparatus.

DESCRIPTION OF THE PREFERRED EMBODIMENT

The illustrative storing and dispensing apparatus, which may conveniently be referred to as a premix bunker, comprises a storage vessel viz a pan 10 having a flat bottom 12, a cylindrical wall 14, and a flat top 16. The pan 10 is supported on a suitable frame 18. A rotor 20 is mounted for rotation in the pan 10. An inlet through which material may be introduced into the pan 10 is provided through the flat top 16 in the form of an inlet tube 22. An outlet slot 24 is cut in the bottom 12 of the pan, the outlet slot 24 being of substantial length relative to the diameter of the bottom 12 of the pan 10 and narrow in comparison with its length. A screw conveyor comprising a screw 26 is disposed beneath the slot, the screw being rotatable in an outlet channel 28 part at least of which is disposed beneath the slot 24 and sealingly secured to the bottom 12 of the pan 10, said part being coextensive with the slot 24. The screw conveyor is arranged to convey material falling through the slot from the pan away from the pan in the operation of the illustrative apparatus.

The illustrative apparatus further comprises means comprising a motor 30 and a transmission, namely a double worm reducer 32 for rotating the rotor 20 relative to the pan 10 as the mixture is introduced through the inlet tube 22. The illustrative apparatus further comprises means comprising a D.C. motor 34 and transmission including a reduction gear 36 for operating the conveyor, viz rotating the screw 26, to withdraw mixture from the pan 10 at a desired rate and for effecting rotation of the rotor 20 relative to the pan 10 in synchronism with the rate of operation of the screw 26.

The depth of the pan 10 is considerably less than the diameter of the pan, for example the pan may be of approximately 183 centimeters in diameter and 51 centimeters deep. An air vent 38 is also mounted on the top 16 of the pan 10. This air vent is of a commercially available type which allows air to escape from the interior of the pan 10 as mixture is introduced into the pan 10 through the inlet tube 22 and allows air to be drawn into the pan from the atmosphere as material is withdrawn from the pan 10 by the conveyor screw 26.

The rotor 20 of the illustrative apparatus comprises a conical central hub 40 secured to a drive shaft 42 which is mounted for rotation coaxially with the pan 10 in bearings (not shown) carried by the frame 18. The hub 40 is conical in shape with the apex of the cone pointing upwardly and the base of the cone spaced only slightly from the flat bottom 12 of the pan 10. The rotor 20 further comprises a plurality of flat blades 44 projecting radially from the hub 40, each blade 44 lying in a vertical plane. Each blade comprises a vertical outer edge 46 in sliding contact with the cylindrical wall 14 or spaced only slightly from the wall 14, and a lower edge contacting the bottom 12 of the pan 10. The lower edge of each blade is provided by a flexible nylon sealing member 48 arranged to scrape along the flat bottom 12 of the pan 10 as the rotor rotates. Each of the blades 44 extend upwardly from the bottom of the pan 10 for a substantial part of the depth: over 25 cm. from the flat bottom 12 at an outer end portion and considerably deeper adjacent the hub, an upper edge of these blades 44 sloping upwardly from its outermost part to its innermost part. The blades 44 divide the pan 10 into a plurality of equal sectors and the contact of the blades with the flat bottom 12 of the wall 14 together with their height militating against leakage of material from one sector to the next: each sector effectively becomes a separate compartment 50. The drive shaft 42 projects upwardly through an opening in the bottom 12 of the pan 10, the opening being bounded by a collar 52 secured to the bottom of the pan 10 and projecting upwardly therefrom. The collar 52 has a cylindrical inner surface closely spaced from an outer cylindrical portion of the collar and an outer surface 54 closely spaced from a complementary inner surface of a lower portion of the conical hub. The collar thus forms a dam militating against escape of material from the pan through the opening. The close spacing of the lower portion of the conical hub from the outer complementary surface 54 of the collar, together with the height of the collar and the close spacing of the internal portion of the collar from parts, at least, of the shaft provides a reasonably efficient seal. If desired, the efficiency of the seal may be improved by providing a sealing member between an upper portion of the hub 40 and an annular upper surface 56 of the collar 52 or between a cylindrical portion of the drive shaft and the cylindrical inner portion of the collar. If desired, an upper portion of the conical hub 40 may be arranged to be removed by an operator to readily gain access to any sealing means provided between the collar and hub and/or drive shaft. In the illustrative apparatus the rotor 20 comprises 8 blades 44 dividing the interior of the pan 10 into 8 compartments 50 all of the same size.

The outlet slot 24 of the illustrative apparatus lies on a chordal path along the bottom 12 of the pan 10, an inner edge 58 (closest to the axis of the rotor 20 and pan 10) of the slot 24 is tangential or substantially tangential to the base of the conical central hub 40 in the illustrative apparatus a short arc of the base of the hub 40 projects over an edge portion of the slot 24. The chordal path on which the slot 24 lies intersects the wall 14 in 2 regions: the slot 24 extends across the bottom 12 of the pan 10 from one of these regions more than half way along the chordal path to the other said regions (see FIG. 1). In the illustrative apparatus the height of the cone is about 51 centimeters (thereby extending almost the full depth of the pan 10) and the diameter of its base is also about 51 centimeters the inner edge 58 of the slot 24 is therefore about 25 centimeters from the axis of the pan 10 and rotor 20; the slot is thus about 127 centimeters long and about 11 centimeters wide. The channel 28 is U shaped configuration where it is disposed beneath the slot and secured to the bottom 12 of the pan 10 and projects beyond the pan 10 at which region the channel 28 is of tubular configuration. At the end of the channel 28 remote from the pan 10 is mounted a diverter mechanism 60 from which 2 outlet tubes 62, 64 extend. A first tube 62 of the outlet tube leads to a subsequent processing means for example the mixing and venting extruder supplied under the tradename MVX hereinbefore referred to. The second outlet tube 64 does not lead to the subsequent processing apparatus but returns to an earlier point in the processing cycle, for example. to the inlet tube 22 of the illustrative apparatus or to the premixer inlet, or if desired to a collector for scrap material. The diverter mechanism 60 may be operated so that material withdrawn from the pan 10 by the screw conveyor passes either through the first outlet tube 62 or through the second outlet tube 64. The conveyor screw 26 of the illustrative apparatus is mounted for rotation in the channel 28 on a drive shaft 66 driven by the D.C. motor 34 through reduction gear 36. The motor 34 is a variable speed motor, the speed of which may be varied by the operator according to the rate at which it is wished for the mixture to be dispensed from the pan 10 by the screw conveyor. A chain drive 68 connects the drive shaft 66 of the conveyor with a shaft of the motor 30, through a free wheel mechanism 70 arranged so that rotation of the shaft 66 will drive the shaft of the motor 30 through the chain drive 68 and free wheel mechanism 70 and thus, through the double worm reducer 32, the rotor 20. Should the motor 30 be operational the free wheel mechanisms 70 ensures that drive is not transmitted via the chain drive 68 from the motor 30 to the drive shaft 66. The illustrative apparatus is conveniently mounted with a batch type premixer disposed above the illustrative apparatus with the outlet of the mixer in communication with the inlet tube 22 so that material discharged from the premixer through the outlet falls through the inlet tube 22 into the pan 10 of the illustrative apparatus and with the outlet tube 62 connected to the inlet ports of a subsequent processing apparatus for example the mixing and venting extruder hereinbefore referred to. In carrying out the illustrative method using the illustrative apparatus a mixture of particulate materials of a desired formulation, which has been premixed by the batch-type premixer hereinbefore mentioned, is discharged rapidly from the outlet of the premixer through the inlet tube 22 into the pan 10. A premixer of suitable capacity for use with the illustrative apparatus would hold about 250 liters of mixture which would be rapidly discharged into the pan in between 20 and 30 seconds. During discharge of the mixture from the premixer into the pan 10 the motor 30 of the illustrative apparatus is operated to rotate the rotor 20 at a suitable speed. A speed of about 10 revolutions per minute would ensure that the rotor rotated between 3 and 5 complete revolutions while the mixture is being introduced from the premixer into the pan 10. The inlet tube 22 is disposed in the top 16 of the pan 10 so that material introduced through the inlet tube 22 is deposited in an annular region between the hub 40 and the wall 14 of the pan 10 remote from the outlet slot 24. As the rotor 20 rotates a layer of the mixture is deposited in each of the compartments 50 as it passes beneath the inlet tube: as the rotor 20 rotates between 3 and 5 times during supply of the mixture to the pan between 3 and 5 layers are disposed one on top of the next in each of the compartments 50. The introduced mixture is subsequently withdrawn from the pan 10 in such a manner that mixture taken from a plurality of the layers is dispensed from the pan 10 simultaneously or substantially so. When it is desired to withdraw mixture from the pan 10 the D.C. motor 34 is operated: this may be a manual operation or conveniently, when the illustrative apparatus is feeding the mixing and venting extruder hereinbefore referred to, the D.C. motor may be operated automatically on receipt of a signal from the mixing and venting extruder requiring a further supply of material. The D.C. motor 34 is caused to operate to rotate the screw 26 of the screw conveyor at a rate suitable to feed the mixture at a desired rate along the channel 28 and through the outlet tube 62 or 64 through which it falls for subsequent treatment. As the screw 26 rotates, mixture from those of the compartments 50 above the slot 24 is withdrawn from the pan 10 by the screw 26. As the screw 26 rotates, the chain drive 68 through the free wheel mechanism 70 and the motor 30 (which is not itself operational at this time) drives the double worm reducer 32 which in turn rotates the drive shaft 42 (to which a final pinion 72 of the reducer 32 is keyed) thus to rotate the rotor 20. The gearing chosen is such that the rate of rotation of the rotor 20, when driven by this means from the D.C. motor 34, is much less than when driven directly by operation of the motor 30. In the illustrative apparatus a rate of rotation of about 4 revolutions per hour may be suitable; however, the rate of revolution of the rotor 20 is dependent upon the rate at which the motor 34 is driven and thus is related to the speed of the conveyor screw 26. The ratio of rate of operation of conveyor to withdraw material and rate of rotation of the rotor 20 is selected to ensure that, by rotation of the rotor 20, mixture in the sectors is pushed slowly about the slot 24 at such a rate that mixture from a plurality of the layers deposited in each compartment 50 falls into the slot 24 simultaneously; preferably material from all of the bottom in appropriate compartments falls into this slot simultaneously and is conveyed away by the screw conveyor. The rotation of the rotor at 4 revolutions per hour during discharge of the mixture from the pan 10 is sufficient to discharge the contents of the pan in a quarter of an hour i.e. 250 liters of mixture (that initially supplied to the pan 10 by premixer) will be supplied to subsequent treatment in a quarter of an hour. For a different discharge rate the speed of the D.C. motor 34 would have to be adjusted suitably. Should it be desired to supply further mixture from the premixer to the pan 10 of the illustrative apparatus during discharge of the mixture from the apparatus, the motor 30 may be started to rotate the rotor at its highest speed of about 10 revolutions per minute and the fresh batch of mixture supplied to the pan. Operation of the motor 30 will have no effect on the conveyor screw 26 because of the free wheel mechanism 70: as the rate at which material is conveyed away from the pan 10 by the conveyor screw 26 is very slow in relation to the speed of rotation of the rotor 20 when fresh material is supplied to the pan 10, very little additional material will fall through the slot 24 during the 20 to 30 seconds in which the supply operation is taking place. Thus the supply of an additional batch of the mixture to the pan 10 during discharge should have little effect on the material being discharged.

In carrying out the illustrative method using the illustrative apparatus the rapid discharge of the mixture from the premixer into the pan should lead to very little segregation of particulate material during supply to the pan. There may be some variation from start to finish of the supply operation though this will not be very great in normal circumstances. Material supplied to the pan 10 from the premixer initially will lie in the first layer in each compartment: that supplied at the end of the supply will lie in the uppermost layer in each compartment (in the method hereinbefore described this would be the third to fifth layer depending on the length of time for which the premixer discharges into the pan). In the illustrative apparatus in carrying out the illustrative method described hereinbefore, 250 liters of mixture will fill the pan 10 to a depth of about 12 cm. from the bottom, a suitable normal operational level. However, two charges of materials may readily be accommodated in the pan (filling the pan to a depth of about 25 cm) without there being any danger of leakage of material from one compartment 50 to the next over the top of the blades 44: it is important that the pan is not filled so full that leakage of mixture over the blades 44 occurs.

Thus, in carrying out the illustrative method using the illustrative apparatus the mixture dispensed from the pan 10 consists of material taken from a plurality of layers. Even if there is a slight variation in the formula in the mixture initially discharged from the premixer into the pan from that discharge at the end of the discharge operation into the pan, dispensing of the mixture in layers representative of various stages in the discharge from the premixer into the pan ensures that any slight variation in formulation from the first discharge layer to the last discharge layer is compensated for so that the mixture dispensed has substantially the same formulation throughout substantially the whole of the dispensing operation. The material dispensed at the start up of a dispensing operation may, however, be slightly off formulation and, if this is the case, the diverter mechanism 60 is operated to cause the initial output of material to flow down the second outlet tube 64 by which it is returned to be recycled. When the formulation of the output has stabilized the diverter mechanism is again operated to cause the output from the channel 28 to flow along the first outlet tube to subsequent processing apparatus for example a mixing and venting extruder as hereinbefore referred to.

Whereas, in an apparatus in accordance with the invention, it is preferred that the conveyor be a screw conveyor, other forms of conveyor may, in some circumstances be used, for example a belt conveyor or a vibratory conveyor.

Whereas, in carrying out the illustrative method, the mix supply of a rubber-based mixture is described, it will be appreciated that the illustrative method and illustrative apparatus may be used to store and dispense other particulate mixtures especially those in which the mixture comprises very large and relatively small particles which tend to segregate and may be regarded as incompatible in a physical sense. Although in the illustrative apparatus the pan 10 has a depth of about 51 centimeters, in carrying out a method in accordance with the invention apparatus may be used which is much deeper provided that the mixture is supplied thereto in a plurality of layers and that the mixture is withdrawn therefrom in a plurality of layers sufficient to provide an output mixture of sufficiently stable formulation. In apparatus in accordance with the invention, the speed of rotation of the rotor is selected so that during supply of the mixture to the pan 10, mixture from a single batch occupies a plurality of layers in the pan. As hereinbefore mentioned the discharge rate of the conveyor is matched with the rate of rotation of the rotor during discharge to ensure that sufficient amount of the mixture is supplied to the conveyor to feed the subsequent processing apparatus at a desired rate while ensuring that each unit of mixture discharged by the conveyor contains a complete "slice" through the layers of mixture stored in the pan 10, thereby ensuring that the discharge formulation remains as constant as possible. The number of blades of the rotor and thus the number of compartments provided is selected as necessary; 8 blades and compartments appear to be a suitable number for the illustrative apparatus and method.

Whereas in the illustrative apparatus the rotor is driven by a shaft extending upwardly through the bottom of the pan 10, in apparatus in accordance with the invention the rotor may be driven from above, e.g. by a shaft extending downwardly from the top of the pan, if necessary with a lower end portion of the rotor supported by the bottom of the pan. Driving of the rotor from above ensures that the only opening in the bottom of the pan is the outlet slot thus eliminating the possibility of leakage around the drive shaft.

I claim:

1. A storage and dispensing apparatus for a mixture of particulate materials comprising, a cylindrical storage vessel having a flat circular bottom and a cylindrical wall extending coaxially therefrom, a rotor mounted for coaxial rotation in the vessel and having a plurality of blades extending radially to the wall and from the bottom for a substantial part of the depth of the vessel dividing the vessel into a plurality of equal rotatable compartments, an inlet at the other end of the vessel for admitting the mixture to the vessel, means for rotating the rotor at a speed coordinated with the rate of admission of the mixture to cause progressive deposition of the mixture in layers in each compartment rotating past the inlet, an outlet slot extending across the bottom so as to comnmunicate simultaneously with several of the rotating compartments, and progressively with all of the compartments during rotation of the rotor, a conveyor screw rotatable in an outlet channel secured to the bottom and underlying and communicating with the slot along its lengths for conducting the mixture falling through the slot simultaneously from several of the rotating compartments and progressively from all of the compartments, and separate means for rotating the screw and drivably connected to the rotor through a free wheeling mechanism so the rotor is driven at one speed during deposition of the mixture and driven at a reduced speed coordinated with the speed of rotation of the screw during conveying of the mixture.

* * * * *